United States Patent [19]

Ham, Jr. et al.

[11] Patent Number: 4,853,820

[45] Date of Patent: Aug. 1, 1989

[54] ELECTRONIC CIRCUIT BREAKER SYSTEMS

[75] Inventors: Howard M. Ham, Jr., Santa Ynez; James J. Keenan, Santa Barbara, both of Calif.

[73] Assignee: Hendry Mechanical Works, Goleta, Calif.

[21] Appl. No.: 245,722

[22] Filed: Sep. 16, 1988

Related U.S. Application Data

[63] Continuation-in-part of Ser. No. 48,936, May 11, 1987.

[51] Int. Cl.[4] ............................................. H02H 3/08
[52] U.S. Cl. ....................................... 361/59; 361/71;
361/75; 361/93; 361/101; 364/483
[58] Field of Search .................... 361/59, 60, 71, 74,
361/75, 87, 93, 94, 98, 100, 101; 340/657, 664;
330/207 P, 298; 364/483

[56] References Cited

U.S. PATENT DOCUMENTS

| | | | |
|---|---|---|---|
| 3,325,684 | 6/1967 | Berger | 361/93 X |
| 3,405,319 | 10/1968 | Barringer | 361/91 X |
| 3,538,426 | 11/1970 | Jones | 361/18 X |
| 3,553,531 | 1/1971 | Rimondini | 307/297 X |
| 3,591,832 | 7/1971 | Pelka | 361/60 |
| 3,748,569 | 7/1973 | Frank et al. | 361/60 x |
| 4,106,070 | 8/1978 | Gordon et al. | 361/60 X |
| 4,360,851 | 11/1982 | Zundel | 361/93 X |
| 4,404,473 | 9/1983 | Fox | 361/93 X |
| 4,430,682 | 2/1984 | Babsch | 361/101 X |
| 4,438,473 | 3/1984 | Cawley | 361/101 X |
| 4,628,397 | 12/1986 | Gareis et al. | 361/98 |
| 4,686,383 | 8/1987 | Craft | 361/75 X |
| 4,772,979 | 9/1988 | Arras | 361/101 X |
| 4,783,714 | 11/1988 | Kalina | 361/93 X |
| 4,791,314 | 12/1988 | Kuo et al. | 361/101 X |

FOREIGN PATENT DOCUMENTS

| | | |
|---|---|---|
| 2415305 | 10/1975 | Fed. Rep. of Germany . |
| 3121754 | 12/1982 | Fed. Rep. of Germany ...... 361/101 |
| 8605926 | 10/1986 | PCT Int'l Appl. .................. 361/101 |

OTHER PUBLICATIONS

National Semiconductor 1982, Linear Data Book, pp. 5-27 to 5-30.
Hexfet Databook, HDB-3, 1985, pp. D-115 to D-120, 1985 Product Selector Guide and Cross Reference, International Rectifier.
Preliminary Data Sheet No. PD-9.454, HEXSense, 5/86, by International Rectifier.

Primary Examiner—Derek S. Jennings
Attorney, Agent, or Firm—Benoit Law Corporation

[57] ABSTRACT

Electronic circuit breakers safeguard a load connected to a power supply against damage from overload conditions. These circuit breakers interrupt flow of overload currents to the load by instantaneously reducing flow of such current from the power supply to the load to a harmless residual current when that electric current flow exceeds a predetermined value. These breakers also avoid downtime after cessation of such a condition by electronically monitoring that residual current to determine when it is safe to restore electric operating current flow to the load. Flow of electric operating current from the power supply to the electronic equipment is restored in response to the latter determination. Preferably, the monitored residual current is used for automatically switching the electronic circuit breaker and the flow of electric operating current electronically back on, when the electronic monitoring has determined that the overload condition has ceased to exist.

43 Claims, 2 Drawing Sheets

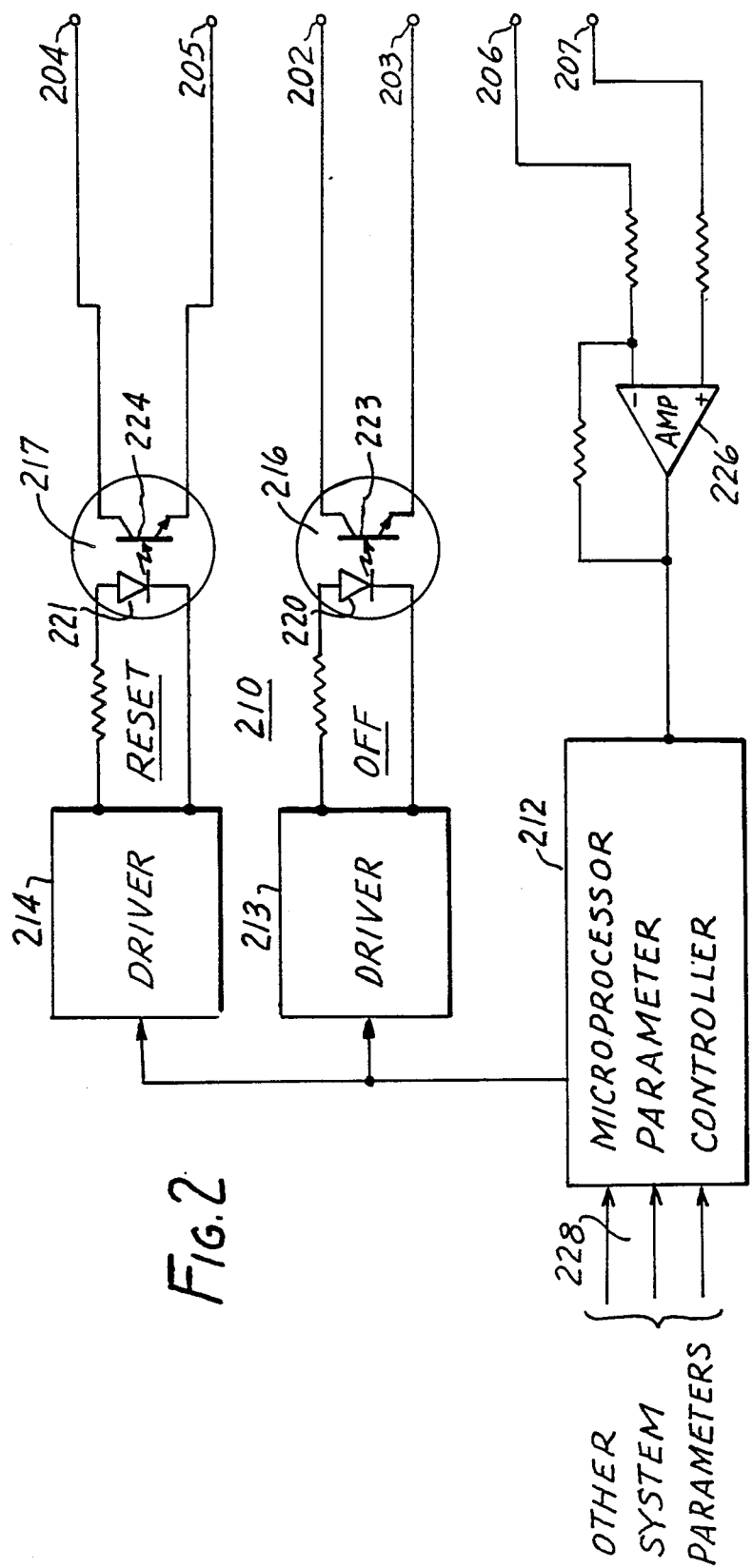

ELECTRONIC CIRCUIT BREAKER SYSTEMS

BACKGROUND OF THE INVENTION

This is a continuation-in-part of Application Ser. No. 07/048,936, filed May 11, 1987, for Electronic Circuit Breaker System, by Howard M. Ham, Jr., assigned to the present assignee hereof, and herewith incorporated by reference herein.

FIELD OF THE INVENTION

The subject invention generally relates to electronic circuit breaker systems and, more particularly, to such systems for safeguarding telephone and other electronic equipment against damage from overload conditions.

INFORMATION DISCLOSURE STATEMENT

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose or providing antecedents for the remainder of a statement of invention or claim.

The traditional means for providing an electric circuit interruption when a fault occurs is a fuse. The fuse is slow to interrupt and must be manually replaced to restore circuit continuity. A typical fuse at 200% of rated load will blow open in 0.5 to 5.0 seconds depending on the type of fuse construction. At 120% of rated load the time is one minute to ten minutes, depending on the type of fuse construction.

Resetable electronic circuit breakers avoid the need of fuse replacements, but may generate similar downtimes of circuits and equipment connected thereto, if manual resetting is required. Also, one or more transistors or other circuit components frequently are destroyed in either case, before the fuse or breaker will interrupt the circuit.

In order to overcome these and other drawbacks summarized therein, U.S. Pat. No. 3,325,684, by J. K. Berger, issued June 13, 1967, for a power supply overload protection with automatic recovery, proposed repeated automatic reconnection of the load to its power supply until the overload condition has ceased to exist. Applying such principle generally may, however, be a rather risky procedure, since it may cause a power source to be repeatedly reconnected to a dead short or since it may damage a defective load or even cause fire and injury.

U.S. Pat. No. 3,591,832, by H. Pelka, issued July 6, 1971, proposed electronic overload protection circuits in which one or two protective transistors shunted the input circuit of an output transistor in the event of a short circuit in the output load. In an effort to avoid a need of resetting pulses, automatic blocking of the shunting protective transistor or transistors via a multi-element voltage divider, including the output load, was also proposed.

U.S. Pat. No. 3,405,319, by J. M. Barringer, issued Oct. 8, 1968, proposed a voltage regulator in which the voltage across the collector-emitter path of a series-regulating transistor was utilized to drive a disabling network biasing the series-regulating transistor in the non-conducting state thereby disabling the regulator, whenever the dissipation across the collector-emitter path exceeded a predetermined value. Barringer is solely concerned with voltage regulation and with the protection of his voltage regulator and particularly of his regulating transistor against overload conditions in their voltage regulating function.

U.S. Pat. No. 3,538,426, by R. E. Jones, issued Nov. 3, 1970, proposed a series regulator with current limiter, in which operating current flow to the load was interrupted for short periods of time when an overcurrent defect was detected. Delivery of electrical power to the load was subsequently restored regardless of whether or not the electrical defect was still present. Accordingly, that type of regulator continued to switch on and off, and therefore intermittently delivered potentially damaging current through a short circuited system.

U.S. Pat. No. 3,553,531, by A. Rimondini et al., issued Jan. 5, 1971, also proposed a voltage stabilizer with overload protection and automatic restoration. An auxiliary generator, shunting regulator transistor means, is activated only upon occurrence of an overload condition, in order to pass a trickle current through the load in the cutoff condition, thereby developing across the load an output voltage rising in the presence of a finite load resistance for reactivating the regulating network, including a feedback amplifier loop, for stabilizing the output voltage through the regulator transistor means. A circuit according to that reference even provides a time constant greater than that of the load to prevent reoperation of the regulator in response to transients developed across a reactive load component. However, the resulting circuitry is complex and extensive, and would be prohibitive for competitive circuit breakers.

U.S. Pat. No. 3,748,569, by G. H. Frank et al., issued July 24, 1973, for a regulated short circuit protected power supply, proposed latching means connected to the base of the trigger transistor to maintain the power supply inoperative until an overload condition was removed and the supply recycled.

German Patent Application No. 24 15 305, by R. Schmitt et al., published Oct. 9, 1975, proposed a circuit arrangement for protecting a transistor against overloads, wherein a transistorized control operated not only in response to the emitter current, but also in response to the collector-emitter voltage of the transistor being protected.

U.S. Pat. No. 4,106,070, by A. M. Gordon et al., issued Aug. 8, 1978, disclosed apparatus for preventing hazardous voltages from appearing on telephone lines.

In an effort to remedy the drawbacks of the apparatus of the above mentioned Jones' patent, U.S. Pat. No. 4,360,851, by A. T. Zundel, issued Nov. 23, 1982, proposed an electronic circuit breaker which was latched into an off state in response to a short circuit condition, until that circuit breaker was disconnected from the load. The resulting requirement of a disconnection of the load for a resetting of the circuit breaker naturally limited that disclosed system to a very special purpose, since it would usually be inconvenient for operating personnel to have to disconnect each load for a resetting of the circuit breaker.

U.S. Pat. No. 4,404,473, by D. A. Fox, issued Sept. 13, 1983, disclosed utilization of field effect transistors (FET) in a direct current power controller operating in a switching regulator mode.

U.S. Pat. No. 4,438,473, by Cawley et al., issued Mar. 20, 1984, disclosed a power supply for an intrinsically safe circuit employing a binary current interrupter and an oscillator for delayed reset.

SUMMARY OF THE INVENTION

It is a general object of this invention to overcome the disadvantages and to meet the needs expressed and implicit in the above Information Disclosure Statement and in other parts hereof.

It is a germane object of this invention to provide improved electronic circuit breakers, as distinguished from voltage regulators, and to render such improved circuit breakers suitable as replacement of fuses, thermal and/or electromagnetic circuit breakers, and as electronic switches providing circuit protection.

It is also an object of this invention to provide improved electronic circuit breakers which will interrupt damaging current more rapidly than fuses and other circuit breakers and which will automatically reset only when the overload condition is cleared or otherwise no longer exists.

It is also an object of this invention to provide novel methods of operating an electronic circuit breaker to avoid damage of a load from overload conditions while minimizing downtime after cessation of such a condition.

It is a related object of this invention to minimize downtime after cessation of an overload condition by automatically switching the electronic circuit breaker and electric operating current electronically back on when a monitoring of a residual current has determined that it is safe to restore electric operating current flow to the load.

It is also an object of this invention to enable more effective use of high-technology switching devices.

It is a related object of this invention to enable increased miniaturization of electronic circuit breaker technology.

Other objects of the invention will become apparent in the further course of this disclosure.

From a first aspect thereof, the subject invention resides in an electronic circuit breaker for preventing damage to a load from overload conditions while minimizing downtime after cessation of such a condition, comprising, in combination, means for interrupting flow of overload currents to the load, including means for instantaneously reducing electric current flow from a power supply to the load to a harmless residual current when that electric current flow exceeds a predetermined value, means for sensing the overload currents, means for connecting at least part of such means for sensing the overload currents and the means for interrupting flow of overload currents in series to a main electric current path to the load, means connected to these electric current flow reducing means for electronically monitoring that residual current, means connected to these monitoring means for indicating when it is safe to restore electric operating current flow to the load, and means for restoring flow of electric operating current from the power supply to the load in response to the latter indication.

From a related aspect thereof, the subject invention resides in an electronic circuit breaker for safeguarding electronic equipment connected to a power supply against damage from overload conditions while avoiding downtime after cessation of such a condition, comprising, in combination, first and second interconnected bistable devices each having a first switching state and an alternative second switching state, means connected to the first bistable device and between the power supply and the electronic equipment for supplying electric operating current to the electronic equipment when the first bistable device is in its first switching state and the second bistable device is in its second switching state, means connected to the first and second bistable devices for switching the first bistable device to its second switching state and the second bistable device to its first switching state in response to an overload condition, means connected to said switching means and to said electric operating current supplying means for interrupting supply of operating current to the electronic equipment in response to said switching of the first bistable device to its second switching state, means connected to the first bistable device for latching the first bistable device in its second switching state when the second bistable device is in its first switching state, means connected to the load for indicating a cessation of the overload condition, means connected to the second bistable device and to said indicating means for returning the second bistable device to its second switching state in response to the latter indication of a cessation of the overload condition, and means connected to the first bistable device for suspending said latching when the second bistable device reverts to its second switching state and for returning the first bistable device to its first switching state whereby supply of electric operating current to the electronic equipment is resumed when the overload condition has ceased.

The subject invention also resides in methods of operating such electronic circuit breakers, and in other improvements, and no restriction to any objects, aspects or feature is intended by the subject Summary of the Invention.

BRIEF DESCRIPTION OF THE DRAWINGS

The subject invention and its various objects and aspects will become more readily apparent from the following detailed description of preferred embodiments thereof, illustrated by way of example in the accompanying drawings, in which:

FIG. 2 is a diagram of a remote control for the first circuit breaker of FIG. 1, whereby that circuit breaker may be operated as a remotely controlled switch according to a further aspect of the invention.

DESCRIPTION OF PREFERRED EMBODIMENTS

Figure 1:
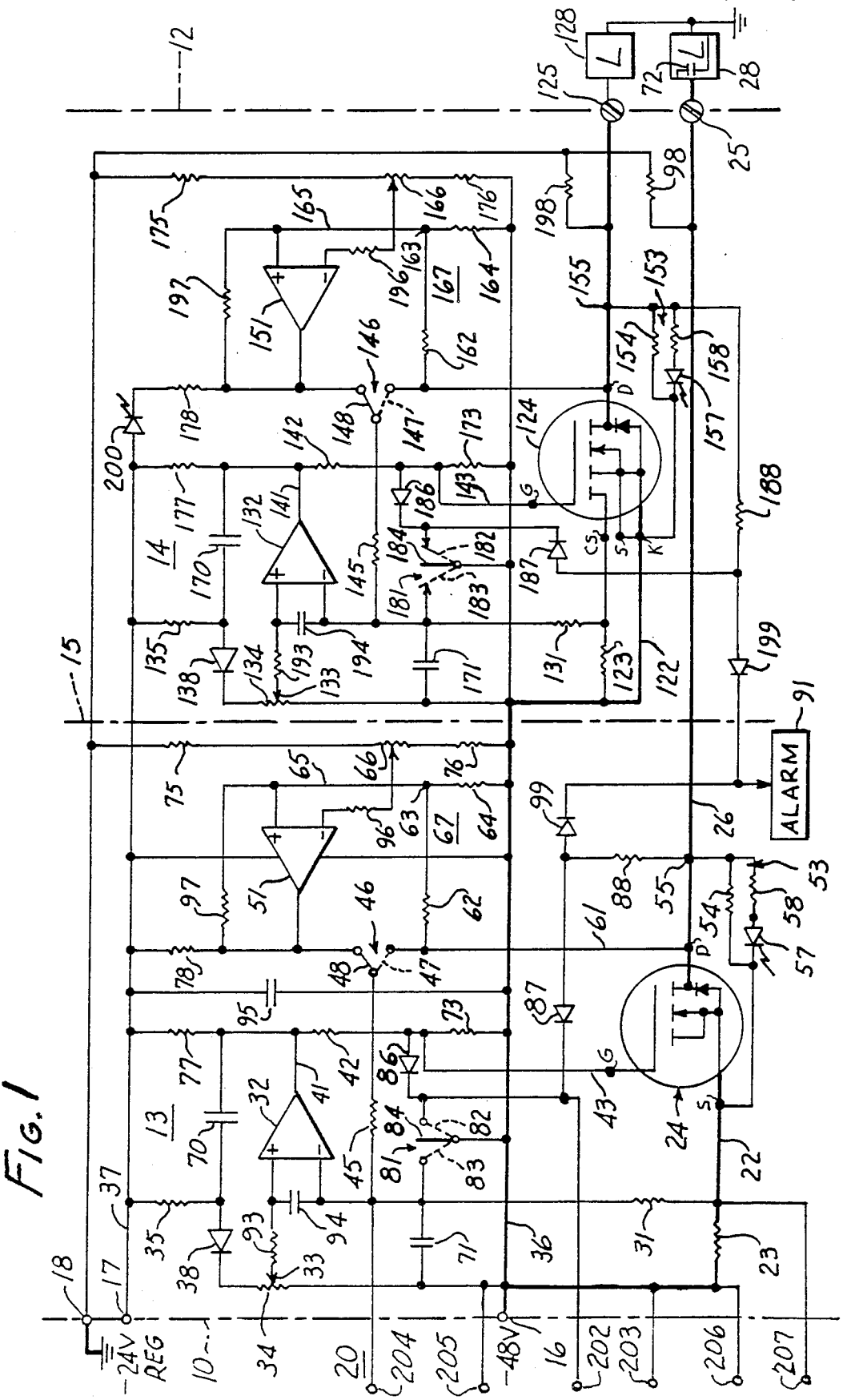
FIG. 1 is a diagram of a circuit breaker according to a preferred embodiment of the subject invention and includes a diagram of a further circuit breaker embodying modifications within the scope of the subject invention.

The physical embodiments of the subject invention are electronic circuit breakers, and the methods according to the subject invention are for operating electronic circuit breakers, as distinguished from voltage regulators and other power sources. Rather than being or operating as a voltage regulated, current regulated or other power source, the systems or apparatus according to the subject invention and its embodiments really are electronic circuit breakers connected in each case between a voltage regulated, current regulated or other power source on the one hand, and a load on the other hand. As its name implies, the main function of each circuit breaker according to the subject invention and its embodiments is to interrupt overload currents from the power source as rapidly as necessary for preventing any damage to the load from continuing overload currents. An equally important function of the circuit breakers according to the subject invention and its embodiments complementing the rapid overload current interruption function just mentioned, is the function of minimizing downtime of any load after cessation of any overload condition, as more fully described below, after the first description of the overload current interrupting function.

By way of background, a phantom line 10 indicates the power source side, while a phantom line 12 indicates the load side of the system, served by the electronic circuit breakers 13 and 14 according to the illustrated preferred embodiments of the subject invention. A third phantom line 15 indicates essentially a division between the first and second circuit breakers 13 and 14 which, by way of example, may be located in different housings or on different circuit boards (not shown). If certain components, such as the comparators 32, 51, 132 and 151 are available in a quad package, then two electronic circuit breakers 13 and 14 may be located on one circuit board, for instance.

The power supply at 10 has a first output terminal 16, a second output terminal 17 and a grounded output terminal 18. For present purposes, the phantom line 10 and the terminals 16 to 18 may, in effect, be considered as symbolizing the power supply 20 not otherwise shown than by these symbols.

The power supply 20 furnishes the line or load voltage through the terminal 16 and a circuit breaker operating voltage through the terminal 17. In telephone systems, for which the illustrated preferred embodiments have primarily been designed, the line voltage at terminal 16 may be −48 volts. In 60-volt-telephone systems, the voltage at terminal 16 may, of course, be −60 volts. Indeed, electronic circuit breakers according to the subject invention are or can be made suitable for handling all kind of line voltages, including those occurring in power distribution systems.

The power source 20 may be regulated or unregulated as far as line voltage and current are concerned, since that has nothing to do with the operation and nature of the electronic circuit breakers according to the subject invention.

On the other hand, the power supply 20 preferably is regulated as to the voltage at the subsidiary terminal 17, to the extent that this may be preferable or necessary for a proper operation of the electronic components of each circuit breaker 13, 14, etc. In this respect, a voltage of −24 volts has been indicated for the terminal 17, but this depends, of course, on what the electronic components actually used in circuit breakers according to the subject invention require in terms of an operating voltage.

During normal operation, the main electric current path 22 through the circuit breaker 13 proceeds from the main terminal 16 through a very low resistor 23 which typically has a value of less than 1 ohm, such as of about 0.05 to 0.50 ohms in the illustrated application.

The main current path 22 then proceeds through the power switch 24 to the output terminal 25 of the circuit breaker 13, shown in this case at the load fanthom line 12. As long as the circuit breaker power switch 24 is closed, electric operating current thus flows in effect from the power supply 20, through terminal 16, resistor 23, power line 22, closed power switch 24, power switch output line 26, terminal 25, load 28, served by the circuit breaker 13, and ground, via ground terminal 18, for instance. The first load 28 thus is supplied with operating power from the common power supply 20 through the first circuit breaker 13.

The voltage drop across the small resistor 23 is, of course, the product of its resistance times the operating current flowing to the load 28 along the main current path 22.

A resistor 31, connected to the junction between the load current resistor 23 and load current path 22 applies the voltage developed as a function of through current across the resistor 23 to a voltage comparator 32, which compares that voltage to another voltage set or predetermined by the wiper 33 of a potentiometer 34 connected in series with a fixed resistor 35 and a diode 38 between the terminals 16 and 17 or between lines 36 and 37 connected to these terminals of the power supply 20.

The power switch 24 of the circuit breaker 31 remains closed and unaffected by the comparator 32, as long as the voltage drop across resistor 23 remains at any of several values indicating normal operation of the load 28 or, in other words, remains below a value that would indicate an overload condition at or beyond the breaker output terminal output 25.

On the other hand, if the load current through, and thereby the voltage drop across, the resistor 23 rises to a value indicating an overload condition, then the comparator trips the switch 24 and thereby the circuit breaker 13 through a comparator output 41, a resistor 42 and a power switch control line 43.

In order to prevent reclosure of the tripped power switch 24 against a short circuit or overload condition, the comparator 32 is latched via a resistor 45 to its tripped condition. If safety concerns in a few specific applications require that no interrupted current be reapplied automatically, the latching of the tripped comparator 32 and thereby of the tripped power switch 24 may be made subject to manual unlatching by a human operator or other person. In that case, a jumper or switch 46 may be moved to its secondary position indicated by a dotted line 47. The main position of the jumper or switch 46, however, is for purpose of automatic resetting the position indicated by a solid line 48.

In that position 48, a second voltage comparator 51 assists in keeping the first voltage comparator 32 latched in its tripped position until the overload condition has been removed or has otherwise ceased to exist. If the voltage comparators 32 and 51 or equivalent means are operated as first and second bistable devices, each having a first switching state and an alternative second switching state, then the power switch 24 may be closed when and as long as such first bistable device 32 is in its first switching state, while the second bistable device is in its second switching state. Occurrence of an overload current through the resistor 23, or another indication of an overload condition, then would switch or trip the first bistable device 32 to its second switching state, thereby causing the power switch 24 to trip or open, such as by being tripped or opened through the control line 43.

The second bistable device 51 then in its second switching state effectively latches the first bistable device 32 in its tripped or second switching state via jumper or switch 46, positioned at 48, and the "feedback resistor" at 45.

One problem solved by the subject invention should be recognized at this point. In particular, when the power switch 24 is tripped, the voltage drop across resistor 23 naturally collapses, even if there is as much as a dead short through the load 28. Accordingly, the latching of the tripped condition of the voltage comparator or first bistable device 32 at that point is very important, since the collapse of the voltage drop across the resistor 23 otherwise could readily cause that bistable device 32 to revert to its first switching state and thereby close the power switch 24 against a dead short or other subsisting overload condition.

On the other hand, if that latching were not checked according to a feature of the subject invention, then the load 28 would be subjected to a prolonged downtime, even if the overload condition that caused the tripping of the circuit breaker 13 would remedy itself instantly. To give here an example, if the load 28 or telephone exchange circuit had experienced a temporary overload condition, such as through the errant screwdriver of a technician, then such telephone exchange circuit would remain down and unenergized, even if the technician would not as much as recognize that his or her by then withdrawn screwdriver had caused a short.

The other side of the coin is, of course, that circuit breakers cannot just be designed on the assumption that each short circuit would remedy itself promptly. There are just a few special applications where such an assumption is justified and may be carried to a certain limited extent.

For instance, high-voltage circuit breakers used in large power distribution systems will, indeed, switch themselves back on automatically after tripping by an overload, since the experience in such systems has been that many short circuits are caused by such agents as birds or other small animals or by such occurrences as swinging wires or falling twigs, especially if free-standing overhead lines are involved. However, even those peculiar systems are designed for manual resetting, if the overload condition recurs rapidly two or three times. As forest fires and other untoward occurrences in different parts of the country indicate, it would be better even in those situations, if resetting of the circuit breaker were not just timed or automatic, but would depend on a favorable sensing of the condition of the power line or load.

In the case of telephone exchange or other delicate equipment, such a modus operandi would no longer be permissible, inasmuch as one or more transistors or other delicate components could be damaged each time electronic circuitry is reconnected to the power supply while still in an overload condition.

As a measure preventive of such damaging occurrences, the electronic circuit breaker according to a preferred embodiment of the subject invention interrupts flow of overload current to the load by instantaneously reducing electric current flow from the supply 20 to the load 28 to a harmless residual current, when that electric current flow exceeds a predetermined value. In principle, that harmless residual current may flow through the power switch 24, after that switch has been tripped in response to an overload condition. This possibility exists especially in the case of semiconductive switches which, unlike high-quality mechanical switches, are never entirely closed and never entirely open, but rather change from a very low resistance in the closed condition to a high resistance in the opened condition.

However, in order to illustrate the principle of the subject invention more clearly and in order to suggest certain practical embodiments of the invention, the illustrated circuit breakers show a high-resistance current flow path 53 acting in parallel t the switch 24 and being of sufficiently high impedance for the desired reduction of electric current flow to a harmless residual current, when the switch 24 is driven to a non-conducting state in response to a sensed overload condition.

According to an embodiment of the invention, the impedance between leads 22 and 26 is on the order of thousands of times higher when the power switch is open, than when that power switch is closed. The current that flows through the bypass 53 thus is proportionately lower, as compared to the current flowing through the switch 24 when the same is closed. For instance, when there is a dead short to ground at the terminal 25 or across the load 28, then the bypass or open switch current is on the order of a hundredth of the normal operating current flowing through the switch 24, when closed, to the load 28, when intact.

While, as mentioned above, all or part of the back impedance may be provided by the "open" switch 24 itself, the illustrated embodiment of the invention shows a resistor 54 which provides whatever back resistance is necessary in parallel to the open switch 24 in order to provide the requisite harmless residual current developing a corresponding voltage at the junction 55 of the resistor 54 and the power line 26 or, broadly speaking, at the output of the open switch 24.

A light-emitting diode (LED) 57 is in the parallel current path 53 in series with a current limiting resistor 58. The LED 57 and its series resistor 58 may be connected in parallel to the other current reducing resistor 57, or to the power switch 24, as shown in the drawing.

When the power switch 24 is opened, current flowing through the short circuit or through the load causes LED 57 to emit light, thereby indicating to the observer that the circuit breaker has tripped, as distinguished from a failure of the power supply 20 or disconnection of the load.

No significant voltage drop develops across the power switch 24 when the same is closed, and the relative voltage at the junction 55 therefore is practically zero. At that point, the first bistable device 32 is in its first switched state, while the second bistable device 51 is in its second switched state, preparatory to a latching of the first bistable device 32 in its second switched state, to which it is tripped in response to an overload condition, for tripping the power switch 24 as well, as described above.

The resetting part of the circuit including the second bistable device 51 electronically monitors the residual current to determine when it is safe to restore electric operating current flow to the electronic equipment or load 28. According to the illustrated preferred embodiments of the invention, this is done by electronically monitoring variations in the voltage drop across the load. The resulting varying voltage is applied through the lead 26, junction 55, lead 61 and resistor 62 to the junction 63 of a voltage divider formed by resistors 62 and 64. A lead 65 connects that junction to the second bistable device or voltage comparator 51, which compares the voltage at junction 63 instantaneously to a predetermined voltage set by a potentiometer 66.

If such comparison indicates that the impedance of the load 28 has reverted to its normal operating impedance, then the second bistable device trips to its first switching state. In other words, that second bistable device 51 trips to its first switching state when the load condition monitoring circuit 67 determines that it is safe to restore electric operating current flow to the load 28.

The resulting change of state of the output of the second bistable device 51 is coupled back to the first bistable device 32 via jumper or switch 46 in its solid position 48 and latching resistor 45. In other words, the latter change of state of the second bistable device 51 in effect removes the latching voltage which kept the first bistable device 32 in its second switching state, after it was tripped in response to an overload condition and, in turn, tripped the power switch 24.

With that latching of the first bistable device 32 removed, and the current through the sensing resistor 23 reduced to the above mentioned harmless residual current, there would be nothing left to prevent the first bistable device 32 from reverting to its first switching state, except for a capacitor 70, connected in series with the diode 38 and across the non-inverting input and the output of the first comparator or bistable device 36 in lieu of a hysteresis resistor. This provides a "timed latch" function which will hold that first comparator in the "off" position to allow the load 28 time to settle. This requirement arises particularly when the load is partially capacitive. When the switch 24 is opened, a partially capacitive load connected thereto will not go to zero volts instantly; rather it will go to zero volts at a rate determined by the RC characteristics of the load 28.

The voltage across the load 28 must be near zero volts to operate the second comparator or bistable device 51, which will latch the system off until the load is again correct.

If the voltage across the load 28 is slow getting to near zero to set that latch, it is possible that the voltage across the sensing resistor 23 will decrease to a level permitting the first comparator 32 to turn the switch 24 on, if the first comparator 32 is not then latched by the second comparator 51. The voltage across the sensing resistor 23 would then again rise to the trip point, turning the switch 24 off, and this cycle will continue to repeat or recur.

Since the voltage across the load 28 may be slow in reaching near zero, some time must be allowed (e.g. 500 msec) for the second comparator 51 to examine the discharged load. If the overload condition was momentary and the second comparator never does latch the system, the switch 24 will be set back to "on" at the end of the period of the "timed latch". If the overload condition exceeds the timed latch period, the switch will not set the system back to "on". The second comparator 51 will latch the system "off" until it senses that the load 28 is within the preset limits at which time the switch 24 will reset to normal service.

The capacitor 70, or one or more equivalent components within the scope of the invention, thus constitute means for preventing malfunction of the second comparator or bistable device 51, which is supposed to indicate when it is safe to restore electric operating current to the load 28. These malfunction preventing means include the capacitor 70 or equivalent means for preventing flow of electric operating current to the load, at least for a period of time corresponding to a discharge time of a capacitive component 72 of that load 28.

It may be said in this respect that the load or electronic equipment 28 has a capacitive or other component 12 etc. which imposes a time delay on a diminution of a voltage across the electronic equipment or load 28 to a negligible value.

However, the second comparator or bistable device 51 will only switch to its first switching state when the latter voltage has diminished to a negligible value that is zero or insignificant relative to the normal operating voltage of the electronic equipment or load 28. To prevent malfunction of the electronic circuit breaker 13 if the voltage across the electronic equipment or load 28 is slow to return to a negligible value, such as because of a capacitive component 72, the capacitor 70 or equivalent time delay means are connected to the first bistable device for latching that device 32 in its second switching state for a period of time corresponding to the time delay imposed by the component 72 or the like.

If thereafter the voltage across the electronic equipment or load 28 diminishes sufficiently for a switching of the second bistable device 51 to its first switching state, then the first bistable device 32 is latched to its second switching state by the second bistable device 51 switching to its first bistable state, as described above. In consequence, the first bistable device 32 only will be able to reclose the load power switch 24 when the overload condition has ceased.

Of course, if the overload condition resolves itself within the delay time imposed by the capacitive load component, then the second bistable device 51 will not and need not latch the first bistable device in its second switching state or "off" condition. Rather, that first bistable device 32 then may reclose the load power switch 24 as soon as the time delay or latching period imposed by the capacitor 70 has expired.

Resistor 31 and a capacitor 71 form an RC filter of such time constant, as to establish a transient filter providing the trip logic with practical noise immunity.

A resistor 73 complements the resistor 42 to form a voltage divider through which the change of state of the first bistable device or comparator 32 is coupled via lead 43 to the power switch 24. The resistor 64 forms a second voltage divider with the resistor 62, through which the above mentioned voltage variations in the tripped condition of the braker are coupled to the second bistable device 51 via leads 61 and 65.

Reset point range may be determined by the value of resistors 75 and 76 connected in series to the potentiometer 66 between the higher voltage terminal 16 of the power supply 20 and ground.

If desired, the circuit breaker 13 may be switched off by a switch 81. That switch has an off position, indicated by a first dotted line 82, in which the switch is mechanically latched until manually released. Switch 81 also has a reset position, indicated by a second dotted line 83, in which the circuit breaker 13 or first bistable device 32 is manually reset, such as when the jumper or switch 46 is in its alternative position 47. The reset position 83 is a spring loaded or other momentary function, as the switch 81 will automatically return to its solidly illustrated center position 84 if the manually applied force which advanced the switch to its reset position 83 is released. Position 84 thus is the normal position of the switch 81, as long as it has not been latched into its off position 82.

A diode 86 connected between the off terminal of the switch 81 and the power switch control line 43 or junction between voltage divider resistors 42 and 73, and a diode 87 connected between that off terminal and a resistor 88 connected to the breaker output lead 26 permit the circuit breaker to be switched off manually without activation of an alarm 91.

Pullup resistors 77 and 78 in effect take the place of loads for the comparators 32 and 51. A resistor 93 and capacitor 94 perform a spike suppression or immunization function at the comparator 32. Noise decoupling may be effected with a capacitor 95. A resistor 96 at the inverting input of the second comparator 51 complements the resistor 64 at its non-inverting input. A hysteresis feedback resistor 97 assures stable operation of the comparator 51.

A resistor 98 between the circuit breaker output terminal 25 and ground prevents the circuit breaker output from floating when no load is connected thereto.

Like components of the circuit breaker 14 relative to the circuit breaker 13 are indicated by reference numerals to which 100 has been added, and the description of breaker 13 may be consulted for a description of these like components, unless otherwise indicated hereinafter.

The alarm 91 may be of a conventional type and is energized when the power switch 24 has been tripped. A signal indicating such tripping, as distinguished from a manual switching off of the circuit breaker 13, is preferably applied to the alarm via a diode or unidirectional current conducting device 99. That diode 99 and other diodes 199, etc. of other circuit breakers 14 etc. form a logic OR element permitting all circuit breakers 13, 14, etc. of an array on a common alarm system 91 without mutual interference.

A clamping diode may be connected in parallel to the resistor 98, with the cathode connected to ground, to protect the circuit breaker against transients.

The bistable devices 32 and 51 may be conventional voltage comparators, such as one of the National Semiconductor Types LM139, 239 and 339, as, for instance, described in the National Semiconductor 1982 Linear Data Book, pages 5-27 to 5-30.

According to the illustrated preferred embodiment of the subject invention, the power switch of each electronic circuit breaker is a field-effect transistor. In other words, it may be said that the means for reducing flow of electric current to a harmless residual current include a field-effect transistor 24 or 124 for switching the electric current flow between the power supply 20 and the load 28 or 128. Electric operating current flow restoring apparatus then include means, such as the first bistable device 32, resistor 42 and control line 43 connected to the field-effect transistor for switching that field-effect transistor to an electric current conducting state in response to an indication or determination that it has become safe to restore electric operating current flow to the load.

In the illustrated embodiment of the invention, the electric operating current flow restoring means also include the second bistable device 51 and the safe load condition monitor 67.

In terms of the illustrated embodiment of the invention, the electric current flow reducing apparatus includes means, such as the first bistable device 32, connected to the field-effect transistor, such as via a control line 43, for driving that field-effect transistor 24 to a non-conducting state when the electric current flow therethrough exceeds a predetermined value, indicating an overload condition. Also, means, such as resistors 54 and 58 and LED 57, provide a current flow path 53 acting in parallel to the field-effect transistor 24 and being of sufficient impedance for the desired reduction of electric current flow to a harmless residual current when the field-effect transistor 24 is driven to its non-conducting state, as mentioned above.

According to the best mode currently contemplated for carrying out the invention, the field-effect transistor 24 or 124 is of a power MOSFET type (metal oxide semiconductor field-effect transistor).

By way of example, the power switching device 24 may be a MOSFET sold by International Rectifier under their registered trademark HEXFET and shown as Types IRF540, 541, 542 and 543 in their Power MOSFET HEXFET Databook, HDB-3, 1985, pages D-115 to D-120. The source (S), gate (G) and drain (D) terminals of those field-effect transistors are shown in the accompanying drawing as well.

The field-effect transistors 24, 124, etc. of the same array of circuit breakers 13, 14, etc. typically will all be of the same type. However, the drawing shows a modification for the second circuit breaker 14 within the scope of an embodiment of the subject invention.

In particular, the power switch 124 is shown as a current sensing field-effect transistor having, in addition to the above mentioned source, gate and drain electrodes or terminals (S,G,D), also a Kelvin source (K) terminal and a current sensing (CS) electrode or terminal. The source and Kelvin terminals are simply interconnected with each other for present purposes. On the other hand, the current sensing terminal is connected to a resistor 123 which, in the second circuit breaker 14, functionally corresponds to the load current sensing resistor 23 in the first circuit breaker 13.

By way of example, the current sensing field effect transistor 124 may be of the HEXSense Type IRC530 or IRC533, as described, for instance, in Preliminary Data Sheet No. PD-9.454, by INTERNATIONAL RECTIFIER, printed 5/86.

Accordingly, in the second circuit breaker 14, the current sensing function is performed by the power switching field effect transistor 124 as well.

The circuit breaker 14 also includes a feature which ties in with the operation of switches 146 and 181, but which may be used in general to provide a visual indication that the load is in operating condition.

In particular, a light emitting diode (LED) 200 may be connected to light up when the load 128, connected to the circuit breaker 14, is in an operating condition. In this respect, the LED 157 may be a red-light emitting diode, and the LED 200 a green-light emitting diode, the circuit breaker gives the observer "the red light," indicating that it has tripped, but alternatively "the green light," indicating that the load is again in operating condition, after an overload condition has been removed or otherwise has ceased to exist.

By way of example, the "green" LED 200 is connected in series with the pullup resistor 178 in the load circuit of the second comparator 151, responding to the switching of that bistable device to its above mentioned second state. A like LED may also be connected correspondingly to the second comparator or bistable device 51 at the first circuit breaker 13, for like purposes.

In practice, this will steer the operator to use the switch 181 properly in the manual mode of the circuit breaker. If the jumper or switch 146 is in its manual mode position 147, the operator will, of course, not reset the switch 181 as long as the "red" LED 157 is shining. On the other hand, the LED 200 gives the operator the green light to manually reset the circuit breaker at 183, as soon as the load has reverted to normal operating condition. This, too, prevents or substantially shortens equipment downtime, even in the manual mode, as long as an operator is present.

In the absence of an operator or attendant, or in general, the jumper or switch 46 is set in the automatic mode position 48, whereby the circuit breaker will reset automatically after an overload condition, thereby minimizing downtime even further.

The means for indicating when it is safe to restore electric operating current flow to the load within the illustrated preferred embodiment of the invention thus include by way of example either the second comparator or bistable device 51 providing that indication in the form of an electric signal via jumper or switch 46 at 48 and resistor 45 to the first comparator or bistable device 32, for an automatic switch on of the circuit breaker and flow of electric operating current, and/or the second light emitting diode 200 providing that indication in a visual form to an operator or attendant, for a manual switch on of the circuit breaker and flow of electric operating current to the load, such as with the aid of a switch 81 or 181.

These are, of courses, only two possible examples. Other variations within the scope of the subject invention include use of a Hall-effect sensor or a gated magnetic sensor in lieu of the resistor 23 or the sensing field-effect transistor 124, and/or use of a flip-flop and direct-current amplifier combination, a saturating operational amplifier, a differential amplifier or another bistable device for either or both of the comparators 32 and 51 in each circuit breaker, and/or use of a low-saturation bipolar transistor or an optically coupled solid state relay for the field-effect transistor 24 or 124, and/or a unijunction transistor, current regulator or constant current diode for the load current or voltage monitoring means 54, 62, etc.

The circuit breaker 13 may be switched off remotely through terminals 202 and 203 which parallel the contacts 82 of switch 81. Conversely, the circuit breaker 13 may be remotely reset via terminals 204 and 205 which parallel the contacts 83 of that switch 81. Such remote control or resetting may be monitored via terminals 206 and 207 which in the example shown in FIG. 1 have the current sensing resistor 23 connected therebetween.

An example of a suitable remote control 210 is shown in FIG. 2. The terminals 204 to 207 shown in FIG. 1 are also shown in FIG. 2, in order to illustrate how the remote control 210 may be connected to the circuit breaker 13. Of course, longer lines than those shown in FIG. 2 may be employed for the purpose of connecting the remote control to the circuit breaker.

The remote control 210 has a microprocessor which may be of a conventional type in order to control the operation or parameters of the circuit breaker, as more fully disclosed below.

That microprocessor 212 operates through a first driver 213 and a second driver 214. In order to provide for totally isolated control inputs, the drivers 213 and 214 may operate through typically conventional optocouplers 216 and 217, which show light-emitting diodes 220 and 221 connected via resistors to the drivers 213 and 214, respectively. FIG. 2 also shows how the optocoupler 216 has a phototransistor 223 connected between terminals 202 and 203, and how the optocoupler 217 has a phototransistor 224 connected between terminals 204 and 205.

The phototransistor 223 thus in effect parallels the contacts 82, while the phototransistor 224 parallels the contacts 83 of the switch 81 shown in FIG. 1.

If all that is required is a remote on/off switching of the circuit breaker 13, then the microprocessor 212 may be of very simple kind, which selectively energizes the driver 213 in order to switch the circuit breaker off, and which alternatively energizes the driver 213 in order to reset the circuit breaker.

In this or an equivalent manner within the scope of the invention, the circuit breaker 13 is operated as a remotely controlled switch by switching that circuit breaker off at a location remote from the circuit breaker and by resetting that circuit breaker from that remote location to restore flow of electric operating current from the power supply 20 to the load 28, when it is safe to restore electric operating current flow to the load. The above mentioned monitoring function may be extended to indicate at the remote location when it is safe to reset the circuit breaker.

As shown in FIGS. 1 and 2, a linear feedback amplifier 226 may be employed to extend the monitoring function to the remote control.

In the illustrated embodiment, the amplifier 226 has inputs connected to opposite ends of the main path resistor 23. In this manner, the amplifier 226 can provide an output indicative of the current in the main path of the circuit breaker, including the above mentioned residual current. The microprocessor 212, which is connected to the output of the monitoring amplifier 226, is thus capable of determining when it is safe to restore electric operating current flow to the load. Again, what has been shown as a microprocessor 212 may in practice be a simple device for preventing reset of the circuit breaker via driver 214, until the voltage drop across the resistor 23 and thereby across the amplifier input terminals 206 and 207 has reached a value indicating that the load 28 is or has returned to a normal operating condition.

However, more sophisticated control functions may be effected with the remote control. For instance, the resetting circuit may include means for overriding or suspending during resetting of the circuit breaker the above mentioned instantaneous reduction of electric current flow in response to what appears as an overload current. By way of example in this respect, many electric motors, large incandescent lamps and other loads have a high starting current each time they are being connected to a power source. Such startup currents are known to blow regular fuses and to trip conventional circuit breakers. Accordingly, special delayed action fuses or delayed action circuit breakers are used to prevent startup current interruption or tripping. However, that at the same time reduces the sensitivity of the fuse or delayed circuit breaker to overload currents occurring after startup.

The embodiment of the subject invention illustrated with the aid of FIG. 2 renders the circuit breaker 13 tolerant to startup currents, but still sensitive to subsequent overload currents for optimum protection of the load, by overriding the circuit breaker tripping function during resetting of the circuit breaker, while subsequently interrupting flow of overload currents in the above mentioned manner with the above mentioned means, including the comparator 32, which trips the switch 24 and thereby the circuit breaker 13 in response to overload currents after the resetting action effected by the remote control 210.

In the illustrated preferred example, this easily can be done with the microprocessor 212, which tolerates a startup current indicated through the amplifier 226 during resetting, but which does not interfere with a circuit breaker tripping function in response to overload conditions of the load, when no resetting of the circuit breaker is desired.

Various system parameters may be implemented with the microprocessor 212 as diagrammatically indicated by system parameter inputs 228 in FIG. 2.

These and other variations and modifications within the spirit and scope of the subject invention will become apparent or suggest themselves to those skilled in the art from and by this extensive disclosure.

We claim:

1. An electronic circuit breaker for preventing damage to a load from overload conditions while minimizing downtime after cessation of such a condition, comprising in combination:
   means for interrupting flow of overload currents to the load, including means for instantaneously reducing electric current flow from a power supply to the load to a harmless residual current when that electric current flow exceeds a predetermined value;
   means for sensing said overload currents;
   means for connecting at least part of said means for sensing said overload currents and said means for interrupting flow of overload currents in series in a main electric current path to the load;
   means connected to said electric current flow reducing means for electronically monitoring said residual current;
   means connected to said monitoring means for indicating when it is safe to restore electric operating current flow to the load; and
   means for restoring flow of electric operating current from the power supply to the load in response to the latter indication.

2. Apparatus as claimed in claim 1, wherein:
said electric current flow reducing means and said restoring means include means connected to said monitoring means for automatically switching said electronic circuit breaker and flow of electric operating current back on in response to said indication.

3. Apparatus as claimed in claim 1, wherein:
said electric current flow reducing means include a field-effect transistor for switching the electric current flow between the power supply and the load; and
said electric operating current flow restoring means include means connected to said field-effect transistor for switching said field-effect transistor to an electric current conducting state in response to said indication.

4. Apparatus as claimed in claim 3, wherein:
said electric current flow reducing means include means connected to said field-effect transistor for driving said field-effect transistor to a nonconducting state when said electric current flow exceeds said predetermined value; and means for providing a current flow path acting in parallel to said field effect transistor and being of sufficient impedance for said reduction of electric current flow to a harmless residual current when said field effect transistor is driven to said non-conducting state.

5. Apparatus as claimed in claim 3, wherein:
at least part of said means for sensing said overload currents is connected in said main electric current path in series with said field-effect transistor.

6. Apparatus as claimed in claim 1, wherein:
said electric current flow reducing means include a current sensing field-effect transistor for switching the electric current flow between the power supply and the load and for sensing when said electric current flow exceeds said predetermined value, and means connected to said current sensing field-effect transistor to a non-conducting state in response to said sensing; and
said electric operating current flow restoring means include means connected to said current sensing field-effect transistor for switching said current sensing field-effect transistor to an electric current conducting state in response to said indication.

7. Apparatus as claimed in claim 1, wherein:
said electric current flow reducing means include means for providing a current flow path acting in parallel to said current sensing field-effect transistor and being of sufficient impedance for said reduction of electric current flow to a harmless residual current when said current sensing field-effect transistor is driven to a non-conducting sate in response to said sensing.

8. Apparatus as claimed in claim 1, wherein:
said monitoring means include means for setting a value for said residual current indicative of a return of said load to a normal operating condition, and means connected to said setting means for sensing a decrease of said residual current to at least as low as said value; and
said electric operating current flow restoring means include means connected to said sensing means for restoring said flow of electric operating current in response to said sensing.

9. Apparatus as claimed in claim 1, wherein:
said means for electronically monitoring include means connected to the load for electronically monitoring voltage drop variations across the load.

10. Apparatus as claimed in claim 1, wherein:
said means for restoring flow of electric operating current include means for preventing malfunction of said means for indicating when it is safe to restore electric operating current, said malfunction preventing means include means for preventing flow of electric operating current at least for a period of time corresponding to a discharge time of a capacitive component of the load.

11. Apparatus as claimed in claim 1, including:
means for switching said circuit breaker off and for alternatively resetting said circuit breaker.

12. Apparatus as claimed in claim 11, wherein:
said indicating means include means for indicating to an operator of said switching means when it is safe to reset said circuit breaker.

13. Apparatus as claimed in claim 1, including:
means connected to said electric current flow reducing means for indicating when said circuit breaker has tripped.

14. An electronic circuit breaker for preventing damage to a load from overload conditions while minimizing downtime after cessation of such a condition, comprising in combination:
> means for interrupting flow of overload currents to the load, including means for instantaneously reducing electric current flow from a power supply to the load to a harmless residual current when that electric current flow exceeds a predetermined value;
> means connected to said electric current flow reducing means for electronically monitoring said residual current;
> means connected to said monitoring means for indicating when it is safe to restore electric operating current flow to the load;
> means for restoring flow of electric operating current from the power supply to the load in response to the latter indication, including means for resetting said circuit breaker;
> means for switching said circuit breaker off; and
> means for remotely locating from said circuit breaker said means for switching the circuit breaker off and said means for resetting said circuit breaker.

15. Apparatus as claimed in claim 14, including:
> means connected to said monitoring means for indicating at said resetting means when it is safe to reset said circuit breaker.

16. Apparatus as claimed in claim 14, wherein:
> said resetting means include means for overriding said means for instantaneously reducing electric current flow during a resetting action; and
> said means for interrupting flow of overload currents include said means for instantaneously reducing electric current flow after said resetting action.

17. Apparatus as claimed in claim 14, including:
> means for sensing said overload currents; and
> means for connecting at least part of said means for sensing said overload currents and said means for interrupting flow of overload currents in series in a main electric current path to the load.

18. An electronic circuit breaker for safeguarding electronic equipment connected to a power supply against damage from overload conditions while avoiding downtime after cessation of such a condition, comprising in combination:
> first and second interconnected bistable devices each having a first switching state and an alternative second switching state;
> means connected to the first bistable device and between the power supply and the electronic equipment for supplying electric operating current to the electronic equipment when the first bistable device is in its first switching state and the second bistable device is in its second switching state;
> means connected to the first and second bistable devices for switching the first bistable device to its second switching state and the second bistable device to its first switching state in response to an overload condition;
> means connected to said switching means and to said electric operating current supplying means for interrupting supply of operating current to the electronic equipment in response to said switching of the first bistable device to its second switching state;
> means connected to the first bistable device for latching the first bistable device in its second switching state when the second bistable device is in its first switching state;
> means connected to the load for indicating a cessation of the overload condition;
> means connected to the second bistable device and to said indicating means for returning the second bistable device to its second switching state in response to the latter indication of a cessation of the overload condition; and
> means connected to the first bistable device for suspending said latching when the second bistable device reverts to its second switching state and for returning the first bistable device to its first switching state whereby supply of electric operating current to the electronic equipment is resumed when the overload condition has ceased.

19. Apparatus as claimed in claim 18, including:
> means connected to the first and second bistable devices for automatically suspending said latching with the second bistable device returning to its second switching state for said return of the first bistable device to its first switching state.

20. Apparatus as claimed in claim 18, wherein:
> said means for switching the first bistable device to its second switching state and the second bistable device to its first switching state in response to an overload condition include means connected to said electronic equipment for switching said second bistable device only to that second switching state when a voltage across said electronic equipment has diminished to a negligible value.

21. Apparatus as claimed in claim 20, including:
> a component in said electronic equipment imposing a time delay on a diminution of said voltage to a negligible value; and
> means connected to the first bistable device for latching the first bistable device in its second switching state for a period of time corresponding to said time delay.

22. Apparatus as claimed in claim 18, wherein:
> said means for indicating a cessation of the overload condition include means for electronically monitoring voltage drop variations across said electronic equipment; and
> said means for returning the second bistable device to its second switching state include means connected to said means for electronically monitoring said voltage drop variations for returning the second bistable device to its second switching state when said monitoring indicates a cessation of the overload condition.

23. A method of operating an electronic circuit breaker for preventing damage to a load from overload currents while minimizing downtime after cessation of such overload currents, comprising in combination the steps of:
> providing said circuit breaker with a main electric current path;
> connecting said circuit breaker with said main current path between a power source selected from the group of voltage regulated, current regulated and other electric power sources, and said load;
> sensing said overload currents in said main current path;
> interrupting flow of current to the load as a function of overload current irrespective of source voltage variation by instantaneously reducing electric current flow from a power supply to the load to a harmless residual current when that electric current flow exceeds a predetermined value;
electronically monitoring said residual current to determine when it is safe to restore electric operating current flow to the load; and
restoring flow of electric operating current from the power supply to the load in response to the latter determination.

24. A method as claimed in claim 23, wherein:
said monitored residual current is used for automatically switching said electronic circuit breaker and flow of electric operating current electronically back on when said monitoring has determined that the overload condition has ceased to exist.

25. A method as claimed in claim 23, including the steps of:
providing a field-effect transistor for switching the electric current flow between the power supply and the load;
reducing said electric current flow with the aid of said field-effect transistor; and
restoring said flow of electric operating current with said field-effect transistor.

26. A method as claimed in claim 25, wherein:
said sensing includes sensing said overload currents in said main current path in series with said field-effect transistor.

27. A method as claimed in claim 25, including the step of:
providing a current flow path acting in parallel to said field-effect transistor and being of sufficient impedance for said reduction of electric current flow to a harmless residual current when said field-effect transistor is driven to a non-conducting state.

28. A method as claimed in claim 27, including the step of:
driving said field-effect transistor to said non-conducting state in response to said electric current flow exceeding said predetermined value.

29. A method as claimed in claim 23, including the steps of:
providing a current sensing field-effect transistor for switching the electric current flow between the power supply and the load;
sensing with the aid of said current sensing field-effect transistor when said electric current flow exceeds said predetermined value;
reducing said electric current flow in response to said sensing with the aid of said current sensing field-effect transistor; and
restoring said flow of electric operating current with said current sensing field-effect transistor.

30. A method as claimed in claim 29, including the step of:
providing a current flow path acting in parallel to said current sensing field-effect transistor and being of sufficient impedance for said reduction of electric current flow to a harmless residual current when said current sensing field-effect transistor is driven to a non-conducting state in response to said sensing.

31. A method as claimed in claim 29, wherein:
said determination includes the steps of setting a value for said residual current indicative of a return of said electronic equipment to a normal operating condition, and sensing a decrease of said residual current to at least as low as said value; and
said flow of electric operating current is restored in response to said sensing.

32. A method as claimed in claim 23, including the step of:
indicating when said circuit breaker has tripped.

33. A method as claimed in claim 23, including the step of:
indicating when it is safe to reset said circuit breaker.

34. A method of operating an electronic circuit breaker for preventing damage to a load from overload conditions while minimizing downtime after cessation of such a condition, comprising in combination the steps of:
interrupting flow of overload current to the load by instantaneously reducing electric current flow from a power supply to the load to a harmless residual current when that electric current flow exceeds a predetermined value;
electronically monitoring said residual current to determine when it is safe to restore electric operating current flow to the load; and
operating said circuit breaker as a remotely controlled switch by switching said circuit breaker off at a location remote from said circuit breaker and by resetting said circuit breaker from said remote location to restore flow of electric operating current from the power supply to the load when it is safe to restore electric operating current flow to the load.

35. A method as claimed in claim 34, including the step of:
extending said monitoring to indicate at said remote location when it is safe to reset said circuit breaker.

36. A method as claimed in claim 34, including the steps of:
suspending during resetting of said circuit breaker said instantaneous reducing of electric current flow; and
reinstating after each resetting an interruption of an overload current flow to the load.

37. A method as claimed in claim 34, including the steps of:
providing said circuit breaker with a main electric current path;
connecting said circuit breaker with said main current path between a power source selected from the group of voltage regulated, current regulated and other electric power sources, and said load;
sensing overload currents in said main current path; and
interrupting flow of current to the load as a function of overload current irrespective of source voltage variation by instantaneously reducing electric current flow from a power supply to the load to a harmless residual current when that electric current flow exceeds a predetermined value.

38. A method of performing an electronic circuit breaker function for safeguarding electronic equipment connected to a power supply against damage from overload conditions while avoiding downtime after cessation of such a condition, comprising in combination:
providing first and second interconnected bistable devices each having a first switching state and an alternative second switching state;
supplying electric operating current to the electronic equipment when the first bistable device is in its first switching state and the second bistable device is in its second switching state;

switching the first bistable device to its second switching state and the second bistable device to its first switching state in response to an overload condition;

interrupting supply of operating current to the electronic equipment in response to said switching of the first bistable device to its second switching state;

latching the first bistable device in its second switching state when the second bistable device is in its first switching state;

returning the second bistable device to its second switching state in response to a cessation of the overload condition; and suspending said latching when the second bistable device reverts to its second switching state and returning the first bistable device to its first switching state to restore supply of electric operating current to the electronic equipment when the overload condition has ceased.

39. A method as claimed in claim 38, including the step of:

automatically suspending said latching with the second bistable device returning to its second switching state for said return of the first bistable device to its first switching state.

40. A method as claimed in claim 38, wherein:

said second bistable device is only switching to its second switching state when a voltage across said electronic equipment has diminished to a negligible value.

41. A method as claimed in claim 40, wherein:

a component in said electronic equipment imposes a time delay on a diminution of said voltage to a negligible value; and said first bistable device is latched in its second switching state for a period of time corresponding to said time delay.

42. A method as claimed in claim 38, including the steps of:

electronically monitoring voltage drop variations across said electronic equipment; and returning the second bistable device to its second switching state when said monitoring indicates a cessation of the overload condition.

43. An electronic circuit breaker for preventing damage to a load from overload conditions while minimizing downtime after cessation of such a condition, comprising in combination:

means for interrupting flow of overload currents to the load, including means for instantaneously reducing electric current flow from a power supply to the load to a harmless residual current when that electric current flow exceeds a predetermined value;

means connected to said electric current flow reducing means for electronically monitoring said residual current;

means connected to said monitoring means for indicating when it is safe to restore electric operating current flow to the load; and means for restoring flow of electric operating current from the power supply to the load in response to the latter indication, including means for preventing malfunction of said means for indicating when it is safe to restore electric operating current, said malfunction preventing means include means for preventing flow of electric operating current at least for a period of time corresponding to a discharge time of a capacitive component of the load.

* * * * *